US008983509B2

(12) United States Patent
Bayraktar et al.

(10) Patent No.: US 8,983,509 B2
(45) Date of Patent: Mar. 17, 2015

(54) INTERNET-BASED SHORT MESSAGE RETRIEVAL AND DISPLAY SYSTEM

(71) Applicant: Argela Yazilim ve Bilisim Teknolojileri San. ve Tic. A.S., Istanbul (TR)

(72) Inventors: Ismail Bayraktar, Istanbul (TR); Baris Yilmaz, Istanbul (TR); Mesut Soyturk, Istanbul (TR); Seyhan Civanlar, Istanbul (TR); Nazli Guney, Istanbul (TR)

(73) Assignee: Argela Yazilim ve Bilisim Teknolojileri San. ve Tic. A.S., Istanbul (TR)

( * ) Notice: Subject to any disclaimer, the term of this patent is extended or adjusted under 35 U.S.C. 154(b) by 39 days.

(21) Appl. No.: 13/848,981

(22) Filed: Mar. 22, 2013

(65) Prior Publication Data

US 2014/0287786 A1    Sep. 25, 2014

(51) Int. Cl.
  *H04W 4/00* (2009.01)
  *H04W 4/14* (2009.01)
(52) U.S. Cl.
  CPC ..................................... *H04W 4/14* (2013.01)
  USPC .......................................... 455/466; 455/405
(58) Field of Classification Search
  CPC .................................. H04W 4/12; H04W 8/18
  USPC ................... 455/466, 405, 424, 426.1, 414.1;
                                                379/88.14–88.19, 120
  See application file for complete search history.

(56) References Cited

U.S. PATENT DOCUMENTS

| 7,031,733 | B2 | 4/2006 | Alminana et al. | |
| 7,149,537 | B1* | 12/2006 | Kupsh et al. | 455/466 |
| 7,373,384 | B2 | 5/2008 | Carrasco et al. | |
| 2004/0082347 | A1* | 4/2004 | Alminana et al. | 455/466 |
| 2004/0082348 | A1* | 4/2004 | Gabriel et al. | 455/466 |
| 2005/0130631 | A1* | 6/2005 | Maguire et al. | 455/414.1 |
| 2006/0128404 | A1* | 6/2006 | Klassen et al. | 455/466 |
| 2007/0025529 | A1* | 2/2007 | Romeo | 379/88.14 |
| 2007/0111704 | A1* | 5/2007 | Linkert et al. | 455/405 |
| 2008/0207236 | A1* | 8/2008 | Boerries et al. | 455/466 |
| 2010/0099444 | A1* | 4/2010 | Coulter et al. | 455/466 |
| 2010/0120456 | A1* | 5/2010 | Karmarkar et al. | 455/466 |

(Continued)

FOREIGN PATENT DOCUMENTS

EP    1908313 B1    12/2008

OTHER PUBLICATIONS

Short Message Peer to Peer (SMPP) Protocol Specification 5.0, SMPP Development Forum, <www.smsforum.net>, Feb. 19, 2013, 166pgs.

(Continued)

*Primary Examiner* — Nathan Taylor
(74) *Attorney, Agent, or Firm* — IP Authority, LLC; Ramraj Soundararajan

(57) ABSTRACT

The present invention is a system and method by which past SMS messages generated or received by a user or a user-application are stored in the telecommunications network, and retrieved by the user at any time using a client application. The system allows the user to access this database using a graphical user interface over the public Internet using a mobile or fixed client to search and view past SMS messages. This system can be used for the user to respond to or resend past SMS messages to his/her or other recipient's mobile terminals as well.

18 Claims, 7 Drawing Sheets

(56) References Cited

U.S. PATENT DOCUMENTS

| | | | |
|---|---|---|---|
| 2011/0116814 A1* | 5/2011 | Shifley et al. | 399/24 |
| 2011/0263236 A1* | 10/2011 | Linkert et al. | 455/415 |
| 2012/0083287 A1 | 4/2012 | Casto et al. | |
| 2013/0080540 A1* | 3/2013 | Cai et al. | 709/206 |
| 2014/0122297 A1* | 5/2014 | Dunlap et al. | 705/26.61 |

OTHER PUBLICATIONS

Mobile Access Part (MAP) Specification, 3GPP TS 09.02, 3GPP Forum, <http://www.3gpp.org>, ver 7.15.0, Mar. 2004, 1115pgs.

General Packet Radio Service (GPRS) Specification, 3GPP TS 29.060, 3GPP Forum, <http://www.3gpp.org>, ver 3.3.0, Jan. 2000, 80pgs.

Universal Mobile Telecommunications System (UMTS); UTRAN lu Interface: General Aspects and Principles, 3GPP TS 25.410, 3GPP Forum, <http://3gpp.org>, ver 9.0.0 (release 9), Jan. 2010, 30pgs.

Universal Mobile Telecommunications System (UMTS); lu Principles, 3GPP TR 23.930, 3GPP Forum, <http://www.3gpp.org>, ver 3.0.0, Jan. 2000, 13pgs.

* cited by examiner

Opt-in Table

| Subscriber Id | MSISDN | PASSWORD | SUBSCRIPTION DATE | STATUS |
|---|---|---|---|---|
| 1 | 905542552959 | 3243 | 12.10.2013/12:33 | Active |
| 2 | 905324320433 | 9549 | 15.09.2013/10:44 | Passive |
| 3 | 905443212343 | 2145 | | |

SMS Storage Table

| Msg Id | Subscriber Id | FROM | TO | DIRECTION | SMS Text | TIME |
|---|---|---|---|---|---|---|
| 1 | 1 | 905542552959 | 905542235093 | Sent | Selam nasılsın akşam buluşuyoruz değil mi? | 09.11.2013/20:55 |
| 2 | 1 | 905554569988 | 905542552959 | Received | Yarın ofise geç kalacağım. Haberin olsun | 22.12.2013/12:23 |
| 3 | 2 | ISBANK | 905443212343 | Received | Isbankasından 0 faizli kredi. 5000 TL'ye kadar | 15.08.2013/22:23 |

FIG.4

INTERNET-BASED SHORT MESSAGE RETRIEVAL AND DISPLAY SYSTEM

BACKGROUND OF THE INVENTION

1. Field of Invention

The present invention relates to a telecommunications network platform, which is a trusted Short Message Service (SMS) probing, filtering, message storage and message-display system to be deployed by service providers. The system allows subscribers to retrieve, view, respond to and forward their historic SMS messages.

2. Discussion of Related Art

Short Message Service (SMS) is a messaging service, which uses standardized interfaces for sending text messages to mobile phones over mobile communication networks. In 2G/3G cellular mobile communication networks, the Short Message Service Center (SMSC) is the essential network component responsible for handling SMS operations of the network. When a user sends an SMS message to a mobile user, the message gets stored in the SMSC which delivers it to the destination mobile user when he/she is available. An SMS message is stored temporarily in the SMSC if the recipient mobile phone is unreachable. It is possible for the sender to specify an expiry period after which the SMS message will be deleted from the SMSC. Once deleted, the SMS message will no longer be available for dispatch to the recipient mobile. The act of specifying an expiry period should be regarded by the sender as a request, where the SMSC can be configured to ignore delivery schedule requests made by the senders.

FIG. 1 shows the network infrastructure components involved in delivering an SMS message in a 2G/3G cellular mobile network operator. Consider a scenario in which an SMS message is sent by a user 101 to another user 119. The SMS message generated by the user 101 is first received by the originating Radio Access Network comprised of Base Station (BS) 110 and Controller 102. Thereafter, the SMS message is sent by Controller 102 to originating Mobile Switching Center (MSC) 104, to which the user 119 is currently registered through Controller 102 and interface 107. MSC 104 then sends the SMS message to SMSC 105 via interface 108. SMSC 105 queries the location of the recipient from Home Location Register (HLR) 103. Based on the location information of the terminating MSC received from HLR 103, SMSC 105 sends the SMS message to MSC 126 to which the user 119 is currently registered. MSC 126 then forwards the SMS message to the receiver via Controller 140 and BS 144 which currently provide service to the user 119.

If the receiver is not in the same mobile network with SMSC 105 as in the case of a user 101 sending an SMS message to another user 118, the message is first delivered to SMSC 105 via originating radio access network and originating MSC 104 as described above. When SMSC 105 queries the location of the recipient user 118 from HLR 103, the address of gateway mobile switching center (GW-MSC) 106 is returned. Therefore, SMSC 105 sends the SMS message to GW-MSC 106 which forwards the SMS message to the operator of the recipient via interconnection link 112. Note that the SMS messages coming from other operators are delivered through the SMSC(s) of the originating users' operators and not the SMSC(s) of the recipient's network.

Besides mobile terminals, it is also possible to create and send an SMS message to a mobile subscriber from an external application, so-called an External Short Message Entity (ESME). In FIG. 1, ESME 178 sends an SMS message to SMSC 105 directly using the Short Message Peer to Peer (SMPP) protocol (see, for example, the Short Message Peer to Peer Protocol Specification 5.0 by the SMPP Development Forum) through interface 114. SMSC 105 then delivers the SMS message to the receiver via either an MSC, which can be MSC 104 or MSC 126, or a GW-MSC, such as GW-MSC 106, depending on the location of the receiving user.

There are two main differences between 2G and 3G systems: one is the type of radio access technology used, and the other is the default existence of a packet-switched core network in 3G systems. These systems give rise to different radio access network components as well as different interfaces that connect the radio access network to the core network. While for 2G cellular systems BS 110 is a Base Transceiver Station (BTS) and Controller 102 is a Base Station Controller (BSC), with 3G systems BS 110 is known as a Node B and Radio Network Controller (RNC) is the name of the structure which controls the operation of Node Bs.

In some 2G mobile operator networks that also support a packet-switched domain by providing General Packet Radio Service (GPRS) services and some 3G mobile operator networks, SMS messages can be delivered to the SMSC through Serving GPRS Support Node (SGSN) 187 using the interface 120 if Controller 102 transfers the SMS message to SGSN 187 instead of MSC 104. This is an option for operators that have a packet-switched domain, as SMSC 105 handles the delivery of the SMS message in a standard way irrespective of which network component it receives the message.

All SMS messages which are created by a subscriber in a network should first make their way to the SMSC of the mobile network operator, from where they are expected to be delivered to their destinations. If the recipient user, which can be either in the operator's network or in another operator's network, is unreachable, for instance, as in the case when the mobile phone is switched off, the MSC or GW-MSC returns the result to the SMSC, and the SMSC temporarily stores the SMS message. The SMSC retries to send the SMS message a few times within pre-defined time intervals and then if it can't deliver the message, the message is erased. Thereby, the SMS messages which are received by the SMSC are not permanently stored in a database.

The pre-grant patent publication to Casto et al. (2012/0083287) describes an external 'SMS storage attached to the SMSC via a Mobile Application Part (MAP) interface (as defined in the MAP Specification—3GPP TS 09.02—by the 3GPP Forum) to store some of the short messages. The SMS storage per user is identified by an identification number (i.e., a mobile number), and that number is stored in 'identification storage' (typically within the HLR). A user of a mobile phone can direct his/her SMS messages to that identification number in which case these SMS messages get stored in the SMS storage of this invention. These messages are stored in a database and can be viewed by a user using a simple web interface. The sender of the SMS message can view or request to have the SMS message sent via an e-mail or can redirect the SMS message to another recipient terminal. While this reference uses a web interface, it is important to note that the SMS message is directed to the SMS storage via an identification number; meaning those SMS messages are not sent to a recipient's mobile phone.

The U.S. Pat. No. 7,373,384 to Bragado Carrasco et al. describes a system in which a mobile user may re-direct his/her SMS messages to a computer attached to the operator's network by sending an SMS message to a specific phone number assigned by the operator. During the redirection, all of the SMS messages of the user are blocked from his/her phone number. Upon sending another SMS message to that specific phone number, all stored SMS messages are directed back to the user's phone. In addition, the system can be configured to send auto-replies to all SMS messages the user receives during the redirection time period. It should be noted that this invention temporarily or permanently blocks the user from receiving SMS messages on his/her phone. It should also be noted that while there is an added capability to capture and store SMS messages in a database in the network, the system in Bragado et al. does not allow an SMS message to be sent to a recipient's cell phone while it is being stored in a database in parallel. It works in an 'either or' manner. The computer in the system, whose implementation details have not been disclosed, most likely mimics a user by proxying its phone number towards the SMSC to receive the SMS messages targeted to that user's phone number.

The E.P. Patent to Van Der Weide (1908313 B1) describes a tool installed either within the SMSC or the SGSN to monitor and diagnose SMS messages. Monitoring can be enabled and disabled by sending an SMS message to the tool. It can monitor all or selected SMS messages. It also has a means for storing collected SMS communication statistics and performance.

SUMMARY OF THE INVENTION

In one embodiment, the present invention discloses a system comprising: a Short Message Service (SMS) monitoring component passively monitoring inbound and outbound signaling messages from a short message service center (SMSC); a SMS filtering component filtering the inbound and outbound signaling messages and identifying one or more signaling message(s) having at least one SMS message addressed to or received from at least one subscriber; computer storage storing identity of the at least one subscriber and the identified at least one SMS message addressed to or received from the at least one subscriber; and a web portal accessible over a network by the at least one subscriber, the web portal rendering an interface via which the at least one subscriber accesses stored historically archived SMS messages including the at least one SMS message. An article of manufacture is also described implementing the same.

Such a system is implemented as part of a 2G or 2.5G network, and the signaling messages are any of the following: a Mobile Application Part (MAP) signaling message, a Short Message Peer to Peer (SMPP) signaling message, or a General Packet Radio Service (GPRS) signaling message.

Such a system may also be implemented as part of a 3G network, and the signaling messages are any of the following: a Mobile Application Part (MAP) signaling message, a Short Message Peer to Peer (SMPP) signaling message, a General Packet Radio Service (GPRS) signaling message, an Iu-CS (Interface in UMTS Circuit Switched) signaling message, or an Iu-PS (Interface in UMTS Packet Switched) signaling message.

In one embodiment, the at least one SMS message originates from an External Short Message Entity (ESME).

In one embodiment, the SMS monitoring component and the SMS filtering component are part of a telecommunication network.

In one embodiment, the storage is accessible over the Internet.

In one embodiment, the system further comprises a subscription component allowing mobile users to subscribe or unsubscribe to SMS storage and monitoring services.

In one embodiment, the subscription component is accessible over any of the following networks: telecommunications network or the Internet.

In one embodiment, a subscription interface of the subscription component is an Interactive Voice Response (IVR) channel, an Unstructured Supplementary Services Data (USSD) channel, a Short Message Service (SMS) channel or a web interface.

In one embodiment, the SMS monitoring component, the SMS filtering component, and the storage are implemented on different computer systems.

In one embodiment, the system comprises a client application that is transferrable to the at least one subscriber or is embedded in a smartphone application of the at least one subscriber, allowing the at least subscriber to: create and send new SMS messages; select, delete, resend, forward, mark spam historic SMS messages; generate auto-reply messages, set auto-reply trigger, suspend auto-reply trigger, send auto-reply messages; create from template or manually greetings, generate groups to receive greetings, setting trigger for sending the greetings at specified times; generate a broadcast SMS message, forming group to receive the broadcast SMS message, receiving responses to the broadcast message, displaying broadcast SMS message and responses as a thread; and participate in game-like activities such as receiving actual or virtual rewards for accomplishing missions.

In one embodiment, the present invention discloses a method comprising: passively monitoring inbound and outbound signaling messages from a short message service center (SMSC) via a Short Message Service (SMS) monitoring component; filtering the inbound and outbound signaling messages and identifying one or more signaling message(s) having at least one SMS message addressed to or received from at least one subscriber via a SMS filtering component; identity of the at least one subscriber and the identified at least one SMS message addressed to or received from the at least one subscriber; and rendering a web portal that is accessible over a network by the at least one subscriber, the web portal rendering an interface via which the at least one subscriber accesses stored historically archived SMS messages including the at least one SMS message.

In one embodiment, the method further comprises the step of allowing mobile users to subscribe or unsubscribe to SMS storage and monitoring services via a subscription component.

In one embodiment, the method further comprises the steps of: receiving a subscription request; returning, in response to the subscription request, service access information comprising a username and a password; and storing the service access information in storage.

In one embodiment, the method further comprises the steps of: receiving an unsubscribe request; requesting a confirmation regarding the unsubscribe request; and upon receiving confirmation, deleting service access information in storage corresponding to the unsubscribe request.

In one embodiment, the method further comprises: accessing the web portal with a client application associated with a given subscriber; retrieving SMS message associated with the given subscriber; and executing any of the following actions associated with the web portal: viewing, searching, organizing in folders, organizing in timeline, creating threads, deleting, sharing with other Internet applications or forwarding the SMS to another client.

BRIEF DESCRIPTION OF THE DRAWINGS

FIG. 4 displays exemplary database tables.

DESCRIPTION OF THE PREFERRED EMBODIMENTS

Figure 1:
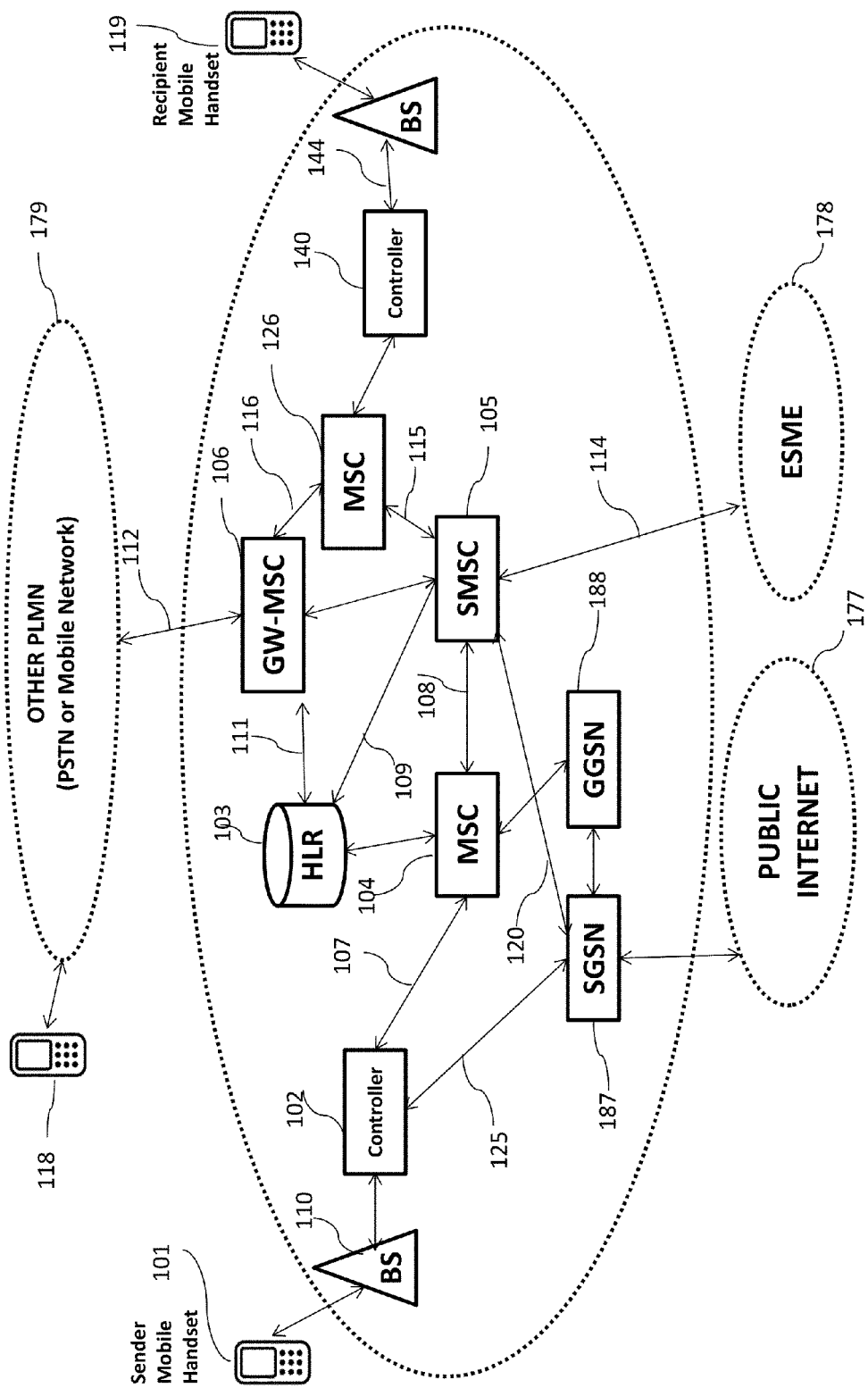
FIG. 1 illustrates the system block diagram of prior art 2G/3G SMS architecture.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

The present invention describes a system and method which enables a mobile user to retrieve past SMS messages using a web-based client application, where the system passively monitors and filters SMS messages generated by users of a mobile network to store and later retrieve upon demand selected messages of users subscribed to the service.

For mobile telecommunication services, there are numerous scenarios in which it is desirable to be able to securely retrieve messages exchanged between parties. In state-of-the-art mobile communication systems, an SMS message is stored in the mobile terminal of the user, and once deleted by the user from the mobile terminal, it is gone; meaning, it is not possible to retrieve it, as SMS messages are not stored in the telecommunications network. Scenarios in which this type of retrieval functionality is desired include, but are not limited to: electronic commerce, in which the message content may include an asset value or monetary amount; valuable advertisements received in an SMS message, contact information or address exchanged through SMS, and other information stored in the SMS message.

Other messaging systems such as e-mail and instant messaging (IM), both based on Internet protocol (IP), provide capabilities to store past messages in a network-based messaging server to allow users to retrieve historic exchanges. For example, e-mail provides the Internet Message Access Protocol (IMAP) protocol by which the user retrieves all e-mail from a network-based e-mail server to its client, while maintaining the original message in the e-mail server's storage. In this scenario, even when the e-mails stored in the e-mail client application are erased, the user can retrieve them from the server. Similarly, IM application stores instant messages in a centralized server, which can be viewed during a chat session. Recently popular social media applications such as Facebook™ provide a similar interface, where the past message exchanges between parties can be viewed on a message panel.

Figure 2:
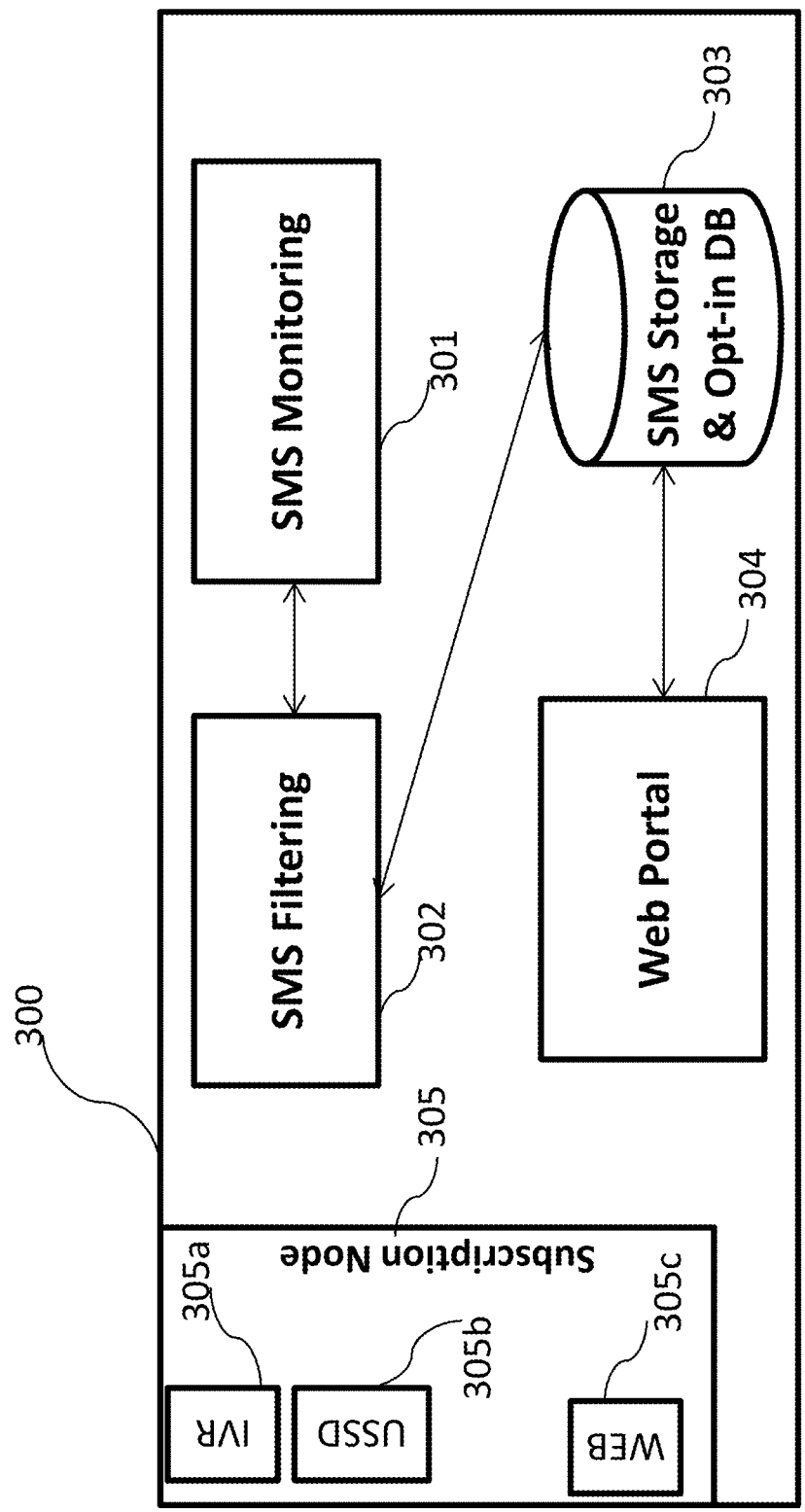
FIG. 2 illustrates the block diagram of the components of the invention.

In FIG. 2, the block diagram of the system of this invention is displayed. The system is comprised of several subsystems which can be located on the same hardware platform or can be distributed:

An SMS Monitoring subsystem 301: Because this component monitors the SMS signaling, it should be positioned in the core network of the operator.

An SMS Filtering subsystem 302: This subsystem filters out the relevant SMS messages that the monitoring subsystem monitors. It should also be positioned in the core network of the operator.

An SMS Storage and Opt-in database (DB) 303: This is where the SMS messages and user subscriptions are stored. It will be accessible from the SMS Web Portal 304 as well as the public Internet. However, it does not need to be collocated with the SMS Web Portal 304.

An SMS Web Portal/Client Application 304: This web portal or client application is used by subscribers to access stored SMS messages. The SMS Web Portal or Client Application will be accessible from the public Internet, and therefore does not need to be in the core network.

A Subscription Node 305: Mobile users subscribe to and unsubscribe from the SMS Storage and Monitoring service through the APIs the Subscription Node 305 provides. With a mobile phone, it is possible to use an Interactive Voice Response (IVR) interface or Unstructured Supplementary Services Data (US SD) codes to perform subscription-related tasks. Interfacing the Subscription Node 305 with a web-based client is yet another option of this invention. While IVR and USSD interfaces are positioned in the core network, the web interface may reside on the Internet. The subscription can also be performed by other means provided by the mobile operator.

Figure 3:
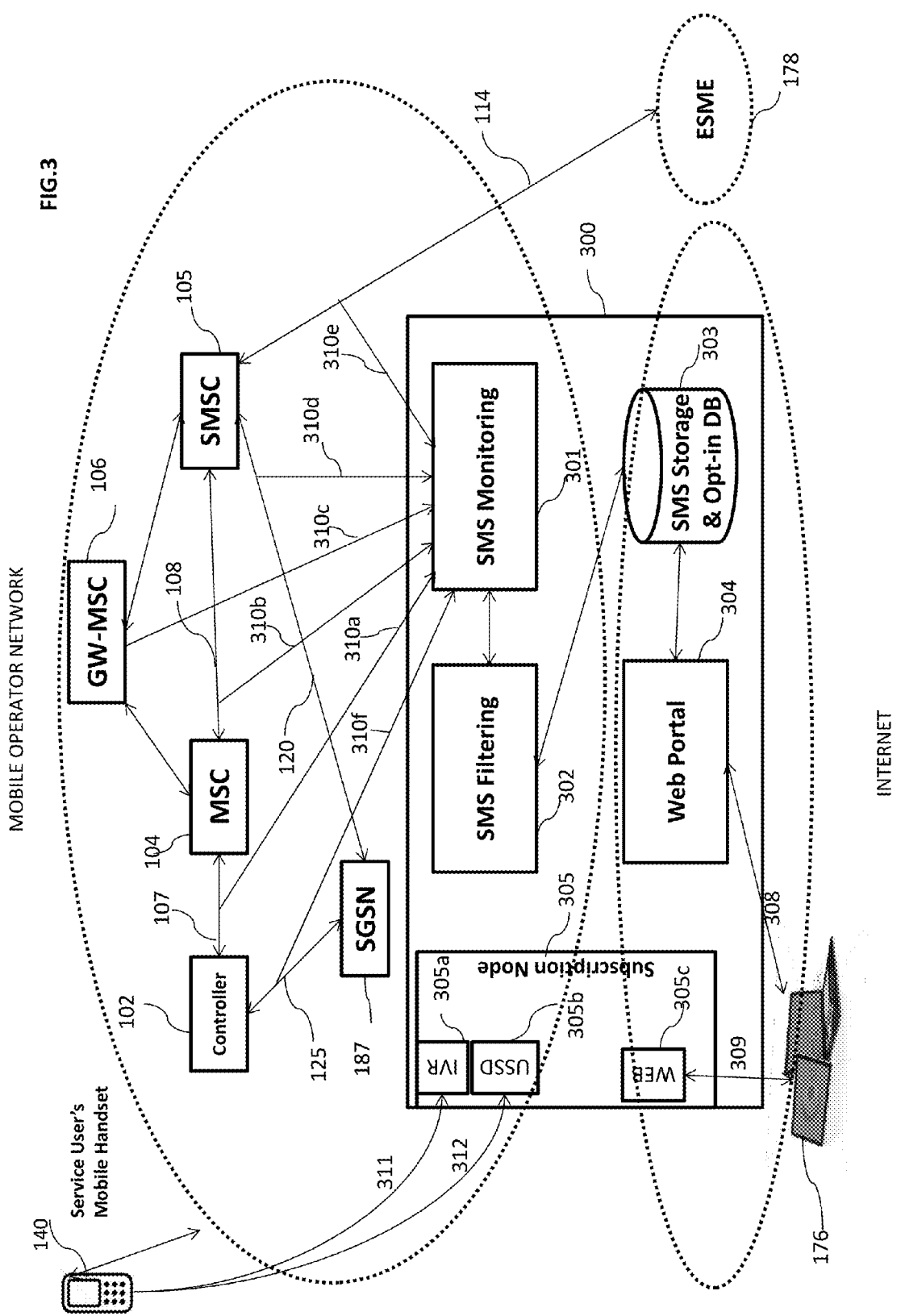
FIG. 3 depicts the block diagram of the invention overlaid on prior art 2G/3G SMS architecture.

FIG. 3 shows an exemplifying architecture of the system as deployed in the mobile operator's network of FIG. 1. Mobile network users who wish to subscribe to the service provided by the system first interact with the Subscription Node 305. When a subscription request is received through either of the links 311, 312 or 309 and using a mobile handset 140 or a computer 176, a password is generated and sent to the user handset 140 via SMS. After subscription, an entry is created in the Opt-in database 303 for the subscribed user.

The SMS Monitoring subsystem 301 makes continuous passive monitoring of the SMS signaling of the network to create copies of SMS messages sent to and from subscribed users. As described previously, an SMS message can be delivered in several ways where the method of delivery depends on the network architecture or configuration. Accordingly, SMS signaling monitoring can be done on several links:

For SMS messages within the same mobile operator's network:

The link 310a—Signaling between Controller 102 and MSC 104, i.e. interface 107

The link 310b—MAP signaling from MSC 104 entering to or exiting from SMSC 105, i.e., interface 108

The link 310d—GPRS signaling between SGSN 187 and SMSC 105, i.e., interface 120

The link 310f for 3G systems—Iu-PS (Interface in UMTS Packet Switched), GPRS (General Packet Radio Service) signaling between Controller 102 and SGSN 187, i.e., interface 125

For SMSs coming from another operator:

The link 310c-MAP signaling messages either entering to or exiting from GW-MSC 106, i.e. interface 116

For SMSs generated from an ESME:

SMPP interface between SMSC 105 and ESME 178, i.e. interface 114.

The system is comprised of a monitoring application that monitors SS7 (Signaling System 7), GSM and/or 3GPP signaling messages carrying SMS messages entering to (or exiting from) one of the Short Message Service Center (SMSC) or a Gateway-MSC (GW-MSC) or an SGSN (Serving GPRS Support Node) or an RNC (Radio Network Controller) by monitoring different type of protocols such as MAP (Mobile Application Part), Iu-CS (Interface in UMTS Circuit Switched), Iu-PS (Interface in UMTS Packet Switched), GPRS (General Packet Radio Service) and/or SMPP (Short Message Peer to Peer), a filtering application which filters the relevant messages, a subscription application, which allows a subscriber to subscribe to the service using an IVR, a web or a USSD channel, a storage application which stores relevant messages and user subscription data in a database, and a web portal from where the subscriber can display SMS messages. The database includes a plurality of SMS records, each record including at least the SMS sender, the SMS receiver, the date and time, and the SMS content fields, as well as user security information for all users such as user name and password.

A copy of the SMS signaling can be forwarded to the SMS Monitoring subsystem 301 using various methods, some of which are:

Using a tapping device,
Using port mirroring on IP Switches,
Using High Impedance monitoring cards.

It should be noted that the above-mentioned listing is a non-exhaustive listing as other methods not listed here can also be used. Once copies of SMS messages are generated, these SMS messages are sent to the SMS Filtering subsystem 302 which filters the SMS messages by referring to the Opt-in part of the database 303. The SMSs which are sent or received by the subscribers in the Opt-in part of the database 303 are saved into the SMS storage part, others are discarded. The SMS Filtering subsystem saves the following data for one SMS record: "Sender MSISDN", "Receiver MSISDN", "DateTime Sent", "SMS Text", and "Direction (Sent or Received)". SMS Storage and Monitoring Application will save one or more copies of an SMS message in the SMS Storage and Opt-in DB 303 depending on sender and receiver user subscriptions. Exemplary database tables are shown in FIG. 4.

Via the SMS Web Portal/Client Application 304, subscribers can display the SMS messages sent to or received by them. Also, users will be able to suspend their subscription from the Web Portal/Client Application 304. Username (can be MSISDN) and password authentication is needed to access the web portal/client application. Also, portal access can be done over one time use passwords. In Web Portal, there will be different views to display the SMS messages. Some of the graphical user interface (GUI) design options are List view
Calendar View
Categorized view (Alphanumeric, Junk, Friends, etc)

From the web portal, users will be able to perform the operations listed below:

Users will be able to select, resend and delete historic SMS messages.

Users will be able to create and send a new SMS message from the Web Portal/Client Application to a single user or a group of users.

Users will be able to select senders and mark them as spam numbers. The SMS messages coming from these numbers will be listed in the junk SMS folder.

Figure 7:
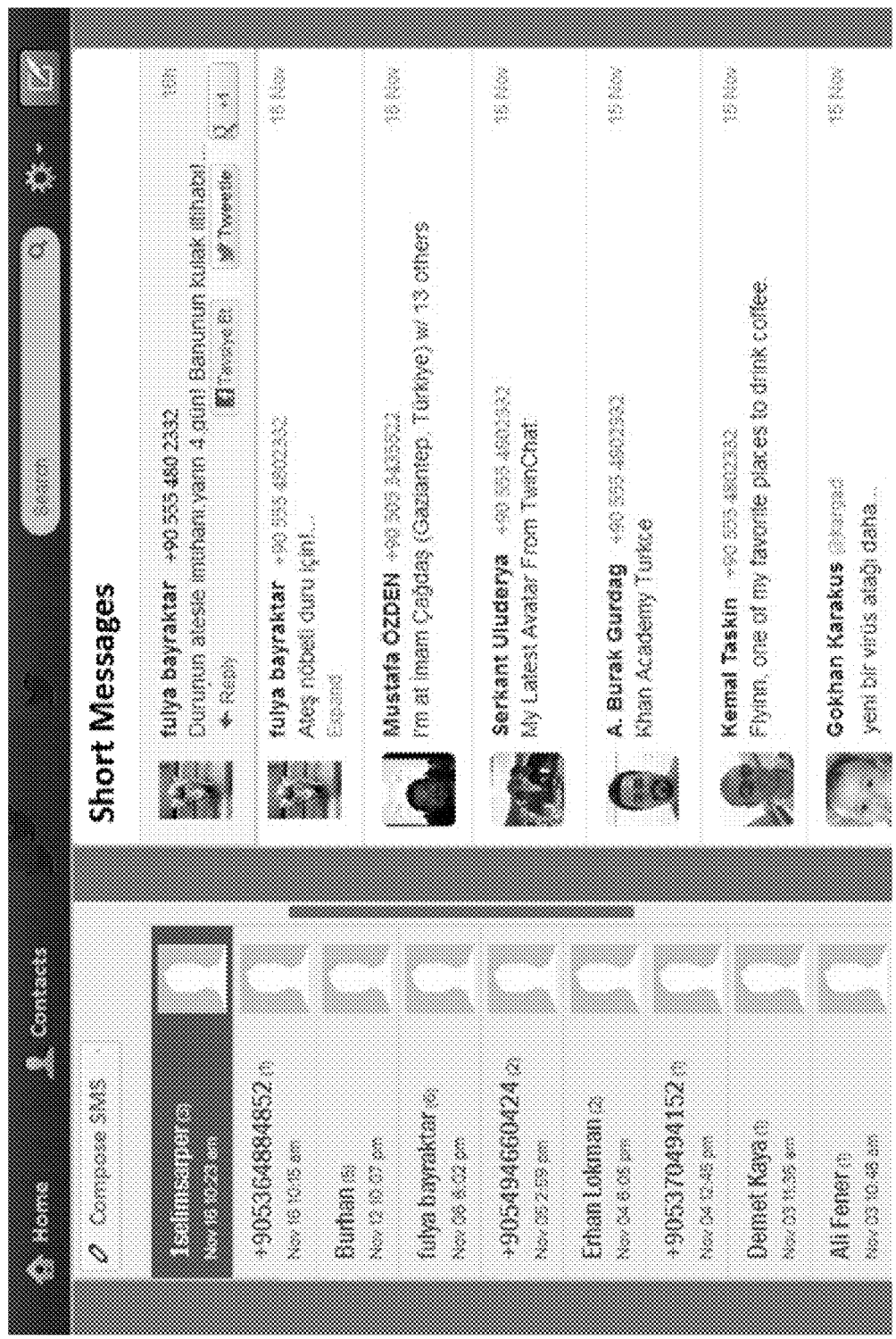
FIG. 7 demonstrates an exemplary screenshot of the invention's user interface.

Users will be able to select SMS messages to share on their social network accounts (see FIG. 7 Facebook™ and Twitter™ icons located under the SMS messages).

Users will be able to select SMS messages to download to their phones.

Users will be able to change their password from the Web Portal/Client Application.

Users will be able to generate and edit auto-reply messages, and initiate and suspend sending of auto-replies.

Users will be able to generate messages or greetings for special events using provided templates or from scratch, and perform grouping of friends to receive the message, where the special message can be sent by using a time/day trigger or can be manually initiated by the users.

Users will be able to send a broadcast SMS message to a group of people, to which group members can respond. That response goes to all members of the group. The group can be formed by the user or others can subscribe to the group (if the user allows). The group formation can be done on the web portal/client application. The broadcast SMS message can be generated on the handset or using the web portal/client application. The web portal/client application can display the broadcast message and the responses to it in a separate thread.

Users will be able to take advantage of the gaming experience provided by the web portal/client application such as receiving missions and rewards (e.g., if you send 100 SMS messages this week, you get a certain reward which can be a real world quantity like free SMS messages or virtual goods to be displayed on the web portal/client application) as well as social status (receiving badges, leveling-up and/or getting higher ranks in leaderboards) in return for successfully accomplished missions, which in return achieves increased user engagement and participation for using the web portal/client application.

Figure 5:
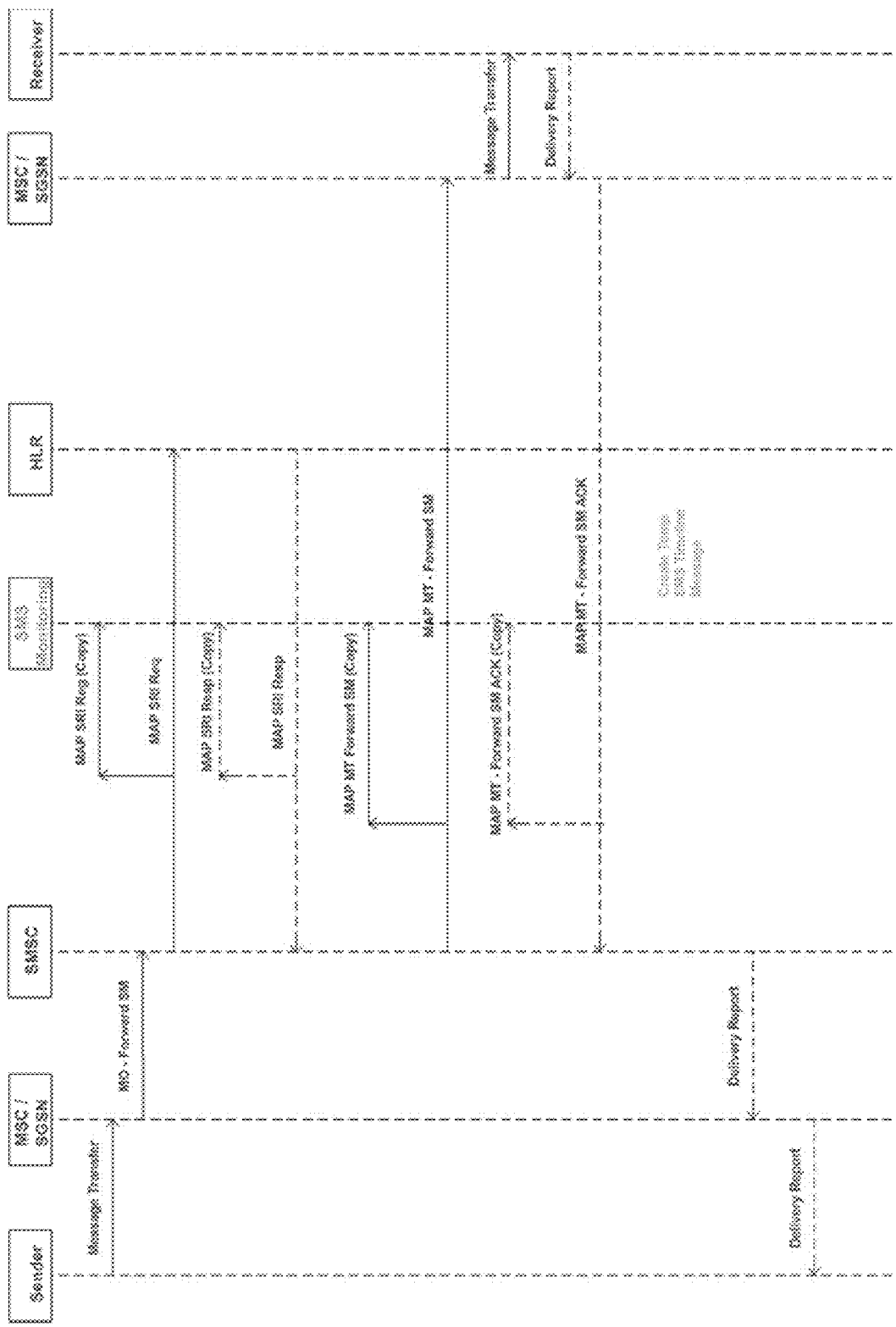
FIG. 5 illustrates an exemplary messaging sequence.

FIG. 5 shows the message flow between the client, the SMSC and the MSC, and how the SMS monitoring subsystem passively monitors signaling messages. According to an aspect of the invention, the monitoring application monitors various types of MAP messages that carry SMS messages. As shown in FIG. 5, the SMS Monitoring can reside adjacent to SMSC intercepting either (1) the signaling messages between the SMSC and the HLR or (2) the signaling messages between the SMSC and the MSC/SGSN. Between the SMSC and the HLR, SMS Monitoring captures the MAP SRI Req message and/or MAP SRI Resp. message. When monitoring the link between the SMSC and MSC/VLR, SMS Monitoring captures MAP MT Forward SM or the response message which is MAP MT Forward SM Ack. By copying these messages, and parsing the content, SMSC Monitoring can obtain the SMS content, and associated other information such as from and to fields, and the time stamp.

Figure 6:
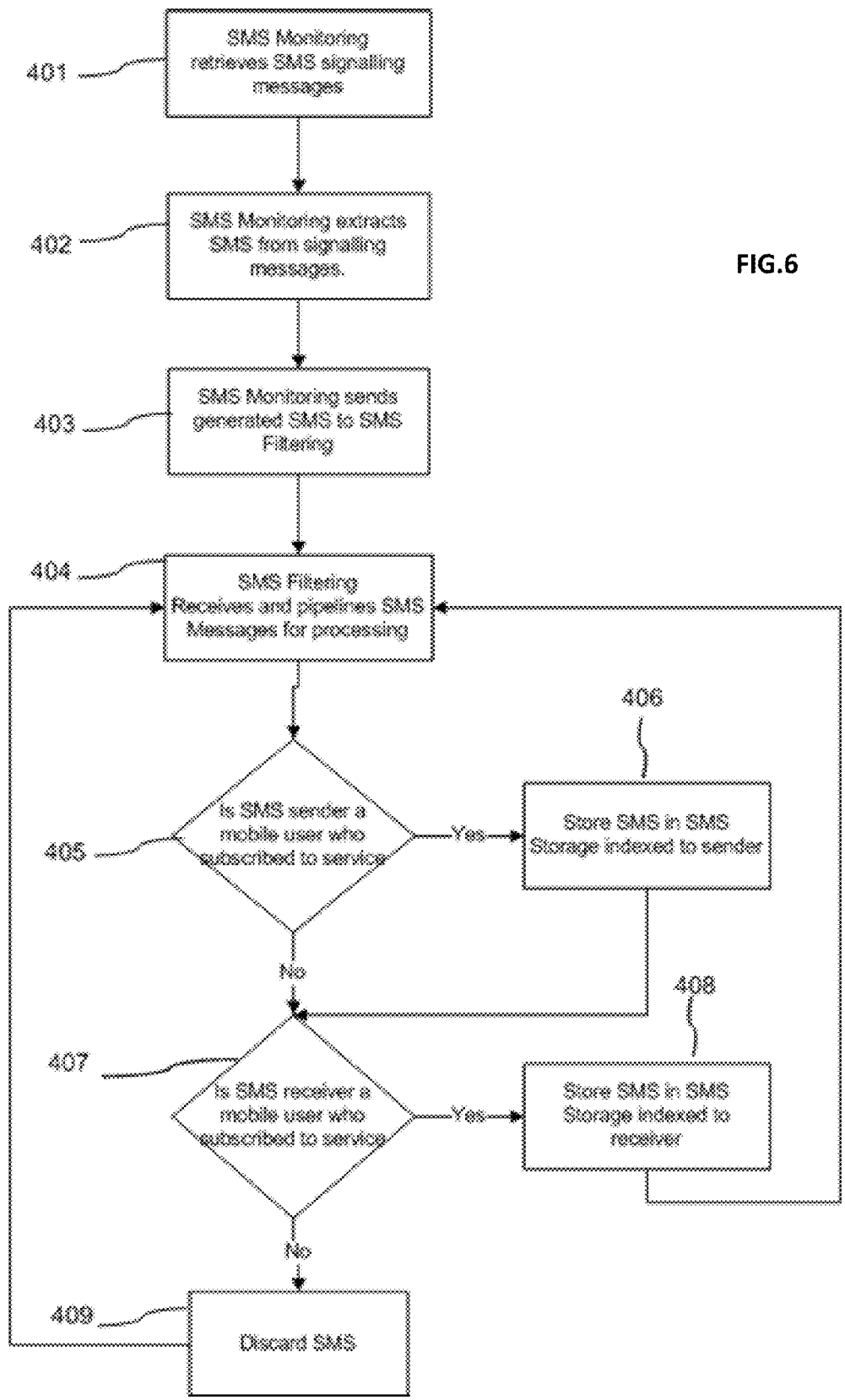
FIG. 6 shows an SMS message filtering flow diagram.

FIG. 6 shows the flow diagram of monitoring and storage according to an aspect of this invention. In step 401, the SMS monitoring subsystem retrieves the SMS signaling message (using one or more of the various 310 interfaces of FIG. 2). SMS monitoring subsystem extracts the SMS content from the signaling message monitored in step 402.

In step 403, the extracted message is sent from the SMS monitoring subsystem to the SMS filtering application of the invention to determine if the extracted message should be stored or discarded. In step 404, the message is received and pipelined for processing in step 404 by the SMS filtering application.

In checkbox 405, the SMS filtering subsystem checks with the subscription database to determine if the sender of the SMS message is a subscriber of the SMS storage service. If yes, in step 406, the SMS is stored in the database and indexed to the sender and the system goes to step 407. If no, the system directly goes to step 407.

In step 407, the application checks to determine if the SMS recipient is a service subscriber and if the answer is yes, the SMS is stored and indexed to the recipient in step 408. If the answer is no, the system discards the SMS in step 409. After steps 408 and 409, system goes back to step 404 for processing the next message in the pipeline.

FIG. 7 shows an exemplary screen shot of the user interface of the client application. According to an aspect of the client application, the user can view the past SMS messages, sort them according to date and sender, delete them from the storage or resend them. The interface also allows the user to compose a new SMS message and send to a mobile recipient. Shown in the left panel is the list of contacts displayed alphabetically or in another order, and the number of SMS messages associated with each contact (in parenthesis next to the contact name or number). Also shown is the date of the last SMS (sent or received). Using the Compose SMS icon, the user can compose an SMS message to a single contact or a group of contacts selected from the Contacts list and send it. Using the Search panel, the user can search for an SMS message using keywords contained in the SMS message. Short Messages Panel on the right hand side shows messages received from contacts displayed by time/date, or alphabetically by sender's name. The user can click reply underneath the message and write a reply using the interface, or expand the SMS message to view more of the content. The user can post the content of the SMS message on his/her Facebook account or generate a Tweet.

Additionally, the present invention provides for an article of manufacture comprising computer readable program code contained within implementing one or more modules to implement the present invention. Furthermore, the present invention includes a computer program code-based product, which is a non-transitory storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

The present invention also provides for an article of manufacture having non-transitory computer readable storage medium comprising computer readable program code executable by a processor to implement a method to monitor, store and render historical SMS messages, said non-transitory medium comprising: computer readable program code implementing a Short Message Service (SMS) monitoring component passively monitoring inbound and outbound signaling messages from a short message service center (SMSC); computer readable program code implementing a SMS filtering component filtering the inbound and outbound signaling messages and identifying one or more signaling message(s) having at least one SMS message addressed to or received from at least one subscriber; computer readable program code storing identity of the at least one subscriber and the identified at least one SMS message addressed to or received from the at least one subscriber; and computer readable program code implementing a web portal accessible over a network by the at least one subscriber, the web portal rendering an interface via which the at least one subscriber accesses stored historically archived SMS messages including the at least one SMS message.

CONCLUSION

A system and method has been shown in the above embodiments for the effective implementation of an Internet Based Short Message Retrieval and Display System. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A system comprising:
   a. an Short Message Service (SMS) monitoring component passively monitoring inbound and outbound signaling messages from a short message service center (SMSC) without replicating any functions of said SMSC or without implementing additional functions in said SMSC;
   b. a SMS filtering component filtering said inbound and outbound signaling messages and identifying one or more signaling message having at least one SMS message addressed to or received from at least one subscriber;
   c. computer storage storing identity of said at least one subscriber and said at least one SMS message in said identified one or more signaling message addressed to or received from said at least one subscriber; and
   d. a web portal accessible over a network by said at least one subscriber, said web portal rendering an interface via which said at least one subscriber accesses stored historically archived SMS messages including said at least one SMS message.

2. The system of claim 1, wherein said signaling messages are any of the following: a Mobile Application Part (MAP) signaling message, a Short Message Peer to Peer (SMPP) signaling message, a General Packet Radio Service (GPRS) signaling message, an Iu-CS (Interface in UMTS Circuit Switched) signaling message, or an Iu-PS (Interface in UMTS Packet Switched) signaling message.

3. The system of claim 1, wherein said at least one SMS message originates from an External Short Message Entity (ESME).

4. The system of claim 1, wherein said SMS monitoring component and said SMS filtering component are part of a telecommunication network.

5. The system of claim 1, wherein said storage is accessible over the Internet.

6. The system of claim 1, wherein said system further comprises a subscription component allowing mobile users to subscribe or unsubscribe to SMS storage and monitoring services.

7. The system of claim 6, wherein said subscription component is accessible over any of the following networks: telecommunications network or the Internet.

8. The system of claim 6, wherein a subscription interface of said subscription component is an Interactive Voice Response (IVR) channel, an Unstructured Supplementary Services Data (USSD) channel, a Short Message Service (SMS) channel or a web interface.

9. The system of claim 1, wherein said SMS monitoring component, said SMS filtering component, and said storage are implemented on different computer systems.

10. The system of claim 1, wherein said system comprises a client application that is transferrable to said at least one subscriber or is embedded in a smartphone application of said at least one subscriber, allowing said at least subscriber to: create and send new SMS messages; select, delete, resend, forward, mark spam historic SMS messages; generate auto-reply messages, set auto-reply trigger, suspend auto-reply trigger, send auto-reply messages; create from template or manually greetings, generate groups to receive greetings, setting trigger for sending the greetings at specified times; generate a broadcast SMS message, forming group to receive the broadcast SMS message, receiving responses to the broadcast message, displaying broadcast SMS message and responses as a thread; displaying promotions, and participate in game-like activities including receiving actual or virtual rewards for accomplishing missions.

11. A method comprising:
  a. passively monitoring inbound and outbound signaling messages from a short message service center (SMSC) via a Short Message Service (SMS) monitoring component without replicating any functions of said SMSC or without implementing additional functions in said SMSC;
  b. filtering said inbound and outbound signaling messages and identifying one or more signaling message having at least one SMS message addressed to or received from at least one subscriber via a SMS filtering component;
  c. storing identity of said at least one subscriber and said at least one SMS message in said identified one or more signaling message addressed to or received from said at least one subscriber; and
  d. rendering a web portal that is accessible over a network by said at least one subscriber, said web portal rendering an interface via which said at least one subscriber accesses stored historically archived SMS messages including said at least one SMS message.

12. The method of claim 11, wherein said method further comprises the step of allowing mobile users to subscribe or unsubscribe to SMS storage and monitoring services via a subscription component.

13. The method of claim 12, wherein said method further comprises the steps of:
  receiving a subscription request;
  returning, in response to said subscription request, service access information comprising a username and a password; and
  storing said service access information in storage.

14. The method of claim 12, wherein said method further comprises the steps of:
  receiving an unsubscribe request;
  requesting a confirmation regarding said unsubscribe request; and
  upon receiving confirmation, deleting service access information in storage corresponding to said unsubscribe request.

15. The method of claim 11, wherein said method further comprises:
  accessing said web portal with a client application associated with a given subscriber;
  retrieving SMS message associated with said given subscriber; and
  executing any of the following actions associated with said web portal: viewing, searching, organizing in folders, organizing in timeline, creating threads, deleting, sharing with other Internet applications or forwarding said SMS to another client.

16. An article of manufacture having non-transitory computer readable storage medium comprising computer readable program code executable by a processor to implement a method to monitor, store and render historical SMS messages, said non-transitory medium comprising:
  a. computer readable program code implementing a Short Message Service (SMS) monitoring component passively monitoring inbound and outbound signaling messages from a short message service center (SMSC) without replicating any functions of said SMSC or without implementing additional functions in said SMSC;
  b. computer readable program code implementing a SMS filtering component filtering said inbound and outbound signaling messages and identifying one or more signaling message having at least one SMS message addressed to or received from at least one subscriber;
  c. computer readable program code storing, in computer storage, identity of said at least one subscriber and said at least one SMS message in said identified one or more signaling message addressed to or received from said at least one subscriber; and
  d. computer readable program code implementing a web portal accessible over a network by said at least one subscriber, said web portal rendered as an interface via which said at least one subscriber accesses stored historically archived SMS messages including said at least one SMS message.

17. The article of manufacture of claim 16, wherein said signaling messages are any of the following: a Mobile Application Part (MAP) signaling message, a Short Message Peer to Peer (SMPP) signaling message, a General Packet Radio Service (GPRS) signaling message, an Iu-CS (Interface in UMTS Circuit Switched) signaling message, or an Iu-PS (Interface in UMTS Packet Switched) signaling message.

18. The article of manufacture of claim 16, wherein said non-transitory medium further comprises computer readable program code implementing a client application that is transferrable to said at least one subscriber or is embedded in a smartphone application of said at least one subscriber, allowing said at least subscriber to: create and send new SMS messages; select, delete, resend, forward, mark spam historic SMS messages; generate auto-reply messages, set auto-reply trigger, suspend auto-reply trigger, send auto-reply messages; create from template or manually greetings, generate groups to receive greetings, setting trigger for sending greetings at specified times; generate a broadcast SMS message, forming group to receive broadcast SMS message, receiving responses to broadcast message, displaying broadcast SMS message and responses as a thread; and participate in game-like activities including receiving actual or virtual rewards for accomplishing missions.

* * * * *